Patented Dec. 16, 1947

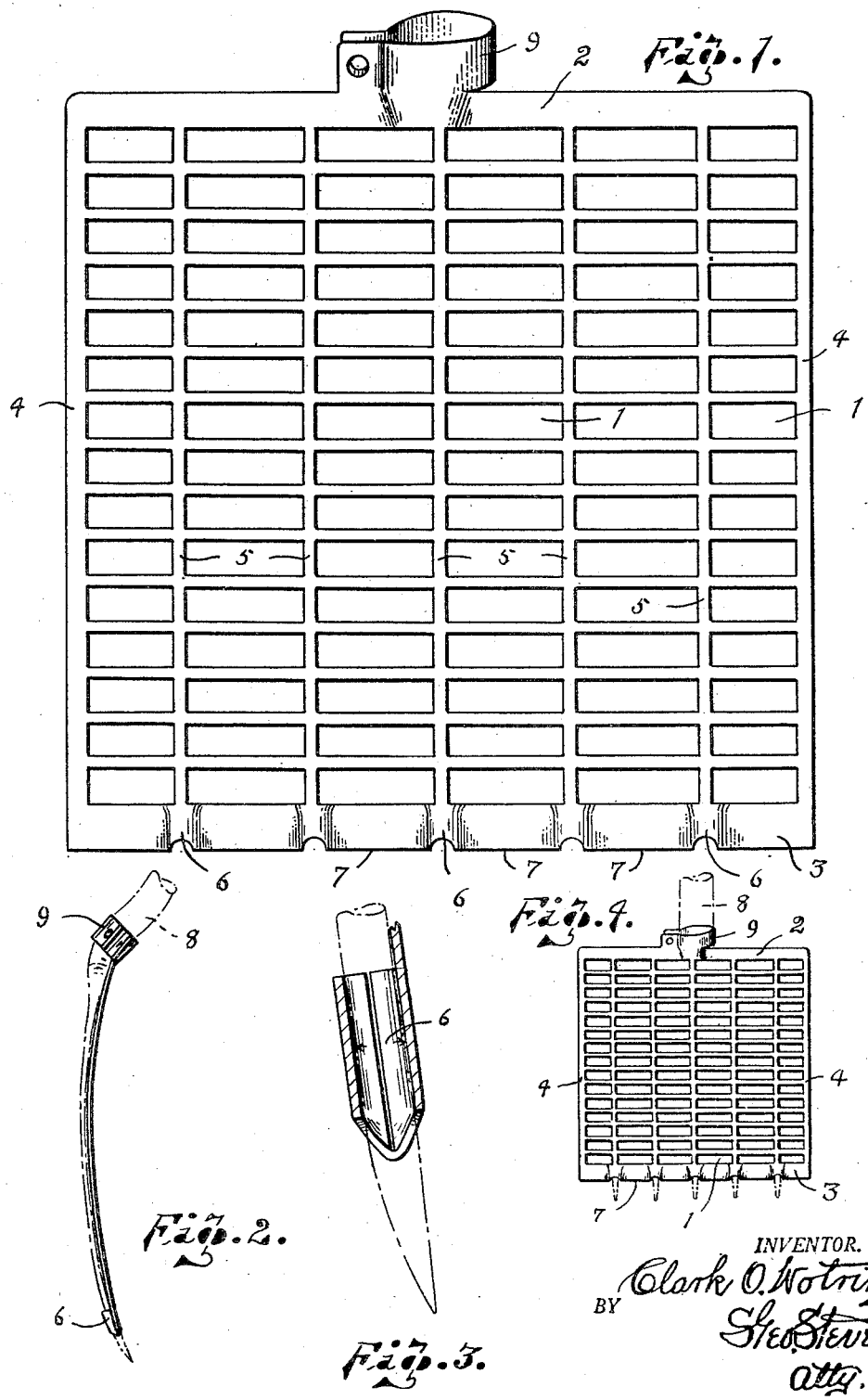

2,432,643

UNITED STATES PATENT OFFICE 2,432,643

LITTER FORK BLADE

Clark O. Wotring, McGregor, Minn.

Application October 1, 1945, Serial No. 619,665

2 Claims. (Cl. 294—51)

This invention relates to an attachment particularly for a manually operated fork as used in cleaning litter in poultry houses where it has so often been proven that cleanliness is paramount to success in such art.

While this is generally true in all classes of poultry raising, it is well known to be particularly so as relates to turkey raising, they being so susceptible to abnormal dampness in the litter used.

It so happens that applicant has been familiar with the turkey raising business for a number of years and in his experiments to produce a simple, sanitary and practical device applicable to a common manure or other fork already on hand, devised the attachment herein set forth and claimed and the objects supra deemed fully accomplished thereby.

Referring now to the accompanying drawing forming part of this application and in which like reference numerals indicate like parts:

Fig. 1 is a top plan view of one of the auxiliary attachments.

Fig. 2 is a reduced side elevation of the attachment as it suggestively might be attached to a fork.

Fig. 3 is an enlarged central sectional view through one of the spaced tine sockets along the lowermost edge of the foraminous blade, and Fig. 4 is a much reduced top plan view similar to Fig. 1, however, more clearly disclosing the relationship of the blade to a fork when attached thereto.

The blade may be of any suitable material such at sheet iron, possibly not much thicker than sixteen gauge, and apertured substantially as shown with rectangularly shaped openings 1 throughout, leaving the upper and lower marginal edge portions 2 and 3 respectively considerably wider than the side edge portions 4—4.

The intermediate somewhat narrower strips 5 and of which there are preferably five, are spaced equidistant apart so that the tine sockets 6 at the lower terminus of each will accommodate either a 2, 3 or 5 tine fork as the sockets are provided for the through reception of the tines of any one of such forks.

These sockets 6 are formed at the lowermost terminus of each division rib or strip 5 by the lower marginal wall 3 being bent back upon itself as clearly seen in Fig. 3, forming the elongated cylindrically shaped socket 6 for each tooth of the fork upon which the blade is attached, and these sockets are preferably in length the full width of the margin member 3, and squeezed tightly together forming relatively sharp edged miniature blades 7 intermediate of each pair of sockets as well as near the termini of said member 3.

Centrally of the upper or head marginal strip 2 of the blade is formed preferably integral therewith the fork handle 8 attaching band 9 it being shown as of an auxiliary portion of the strip 2 bent in a circle to embrace the handle of a fork and of a length when its termini are bolted together to forcibly clamp the handle of the fork upon which the blade is being used.

It is thought that this type of perforated blade may prove quite practical and convenient for the separation of other mixed and unequally sized objects but is well known to be very efficient for the special purpose of cleansing sand litter used in a turkey house for catching the droppings, and that in many instances the litter in a reasonably large turkey house or pen has been thoroughly sifted and materially dried out by the removal of practically all droppings in approximately fifteen minutes.

This becomes possible principally due to the fact that fresh droppings invariably gather, when striking the dry fine sand, considerable of the latter about each individual unit thereof and retains same during the use of the improved blade in the shoveling and screening process.

It is true that turkey droppings do not vary a great deal in general shape and size and obviously the openings 1 through the blade must be of a size to prevent the droppings from falling therethrough with the sand, thus the exceptional convenience.

Of course, if for handling the droppings and litter from smaller poultry, it may be convenient to make the opening through the blade much smaller.

Having thus described one practical embodiment of my invention, what I claim is:

1. A unitary foraminous sheet metal blade for attachment to a litter fork, having the lower edge thereof turned backwardly and perforated for reception of the tines of said fork characterized by said perforations being centrally of said fold so as to insure the engaging edge of said blade being centrally aligned with the axis of said tines.

2. As a new article of manufacture, a blade for attachment to a litter fork comprising a unitary foraminous piece of sheet metal having its lower edge turned backwardly upon itself and perforated centrally of said fold and pressed to form elongated through tine receiving sockets intermediate of which the cutting edge of the blade is aligned with the axis of said sockets.

CLARK O. WOTRING.

REFERENCES CITED

The following references are of record in the file of this patent:

UNITED STATES PATENTS

| Number | Name | Date |
|---|---|---|
| 674,117 | Lefebvre | May 14, 1901 |
| 707,948 | Spillane | Aug. 26, 1902 |
| 1,107,583 | Burchell | Aug. 18, 1914 |
| 1,220,453 | Peterson | Mar. 27, 1917 |
| 1,442,671 | Krehbiel | Jan. 16, 1923 |